US012020510B2

(12) United States Patent
Kudo (10) Patent No.: US 12,020,510 B2
(45) Date of Patent: Jun. 25, 2024

(54) PERSON AUTHENTICATION APPARATUS, CONTROL METHOD, AND NON-TRANSITORY STORAGE MEDIUM (71) Applicant: NEC Corporation, Tokyo (JP)

(72) Inventor: Yuta Kudo, Tokyo (JP)

(73) Assignee: NEC CORPORATION, Tokyo (JP)

(*) Notice: Subject to any disclaimer, the term of this patent is extended or adjusted under 35 U.S.C. 154(b) by 448 days.

(21) Appl. No.: 17/417,939

(22) PCT Filed: Dec. 11, 2019

(86) PCT No.: PCT/JP2019/048414
§ 371 (c)(1),
(2) Date: Jun. 24, 2021

(87) PCT Pub. No.: WO2020/137536
PCT Pub. Date: Jul. 2, 2020

(65) Prior Publication Data
US 2022/0076005 A1 Mar. 10, 2022

(30) Foreign Application Priority Data
Dec. 28, 2018 (JP) ................. 2018-248213

(51) Int. Cl.
*G06V 40/20* (2022.01)
*G06F 18/21* (2023.01)
(Continued)

(52) U.S. Cl.
CPC .............. *G06V 40/25* (2022.01); *G06F 18/21* (2023.01); *G06F 18/22* (2023.01); *G06F 21/32* (2013.01);
(Continued)

(58) Field of Classification Search
CPC ...... G06V 40/25; G06V 10/758; G06V 20/46; G06V 40/10; G06F 18/21; G06F 18/22; G06F 21/32
See application file for complete search history.

(56) References Cited

U.S. PATENT DOCUMENTS 9,460,557 B1 * 10/2016 Tran ...................... G06T 15/205
2006/0120564 A1  6/2006 Imagawa et al.
(Continued)

FOREIGN PATENT DOCUMENTS

JP     2010-218562 A    9/2010
JP     2010239992 A    10/2010
(Continued)

OTHER PUBLICATIONS

D. Thapar et al. , "VGR-Net: A view invariant gait recognition network", Oct. 13, 2017, IEEE, arXiv.org, pp. 1-8. (Year: 2017).*
(Continued)

*Primary Examiner* — Diane D Mizrahi (57) ABSTRACT

A person authentication apparatus (20) generates one or more second image sequences (50) by applying a predetermined time-series operation to a first image sequence (40) acquired from a camera (10). The person authentication apparatus (20) extracts, from each of two or more image sequences among the first image sequence (40) and the second image sequence (50), a gait feature of a person included in the image sequence. The person authentication apparatus (20) performs authentication of a person by comparing the plurality of extracted gait features with a verification feature stored in a verification database (30).

12 Claims, 7 Drawing Sheets

(51) Int. Cl.
  G06F 18/22    (2023.01)
  G06F 21/32    (2013.01)
  G06N 3/02     (2006.01)
  G06V 10/75    (2022.01)
  G06V 20/40    (2022.01)
  G06V 40/10    (2022.01)

(52) U.S. Cl.
  CPC .............. *G06N 3/02* (2013.01); *G06V 10/758* (2022.01); *G06V 20/46* (2022.01); *G06V 40/10* (2022.01)

(56) References Cited

U.S. PATENT DOCUMENTS

| | | | |
|---|---|---|---|
| 2015/0363638 A1 | 12/2015 | Takahashi | |
| 2022/0026920 A1* | 1/2022 | Ebrahimi Afrouzi | G06N 3/006 |

FOREIGN PATENT DOCUMENTS

| | | |
|---|---|---|
| JP | 2013-137604 A | 7/2013 |
| JP | 2013210845 A | 10/2013 |
| JP | 2017205135 A | 11/2017 |
| JP | 2018026018 A | 2/2018 |
| WO | 2006013765 A1 | 2/2006 |
| WO | 2014125882 A1 | 8/2014 |
| WO | 2014196134 A1 | 12/2014 |

OTHER PUBLICATIONS

Japanese Office Action for JP Application No. 2020-563040 dated Feb. 14, 2023 with English Translation.

International Search Report for PCT Application No. PCT/JP2019/048414, dated Mar. 3, 2020.

English translation of Written opinion for PCT Application No. PCT/JP2019/048414, dated Mar. 3, 2020.

Daksh Thapar et al., "VGR-Net: A View Invariant Gait Recognition Network", IEEE 4th International Conference on Identity, Security, and Behavior Analysis (ISBA 2018), Jan. 2018, pp. 1-8, arXiv:1710.04803v1 [cs.CV] Oct. 13, 2017.

Mori Atsushi et al., "Gait Identification using period-based phase synchronization for low frame-rate videos", IEICE Transactions on Information and Systems, Aug. 2011, pp. 1290-1299. vol. J94-D No. 8, Japan, non-official translation.

Moriwaki Kousuke et al., "Gait authentication considering human attributes", IPSJ SIG Technical Report, Computer Vision and Image Media, May 10, 2018, pp. 1-7, vol. 2018-CVIM-212 No. 22, Japan, non-official translation.

* cited by examiner

FIRST IMAGE SEQUENCE 40

SORT IN INVERSE ORDER

SECOND IMAGE SEQUENCE 50

PERSON AUTHENTICATION APPARATUS, CONTROL METHOD, AND NON-TRANSITORY STORAGE MEDIUM

CROSS-REFERENCE TO RELATED APPLICATIONS

This application is a National Stage Entry of PCT/JP2019/048414 filed on Dec. 11, 2019, which claims priority from Japanese Patent Application 2018-248213 filed on Dec. 28, 2018, the contents of all of which are incorporated herein by reference, in their entirety.

BACKGROUND

The disclosure relates to verification of a person using a video.

A related authentication apparatus based on a general gait achieves authentication of a person by extracting a feature (hereinafter, a gait feature) that expresses time-series information of a walking person, and comparing the extracted gait feature. Patent Document 1 (International Patent Publication No. WO2006/013765), Patent Document 2 (Japanese Patent Application Publication No. 2010-239992), Patent Document 3 (Japanese Patent Application Publication No. 2018-26018), and Non Patent Document 1 Daksh Thapar, Divyansh Aggarwal, Punjal Agarwal, and Aditya Nigam, "VGR-Net: A View Invariant Gait Recognition Network", IEEE 4th International Conference on Identity, Security, and Behavior Analysis (ISBA 2018), January 2018) relate to a gait feature. A gait feature described in Patent Document 1 is a positional relationship of a leg portion in each time. A gait feature described in Patent Document 2 is information about a movement of a leg portion such as a step, a pace, or a walking speed, and skeletal information such as a leg length. A gait feature described in Patent Document 3 is a frequency component of an amount of movement of a silhouette. Non Patent Document 1 discloses a technique for extracting a gait feature from the entire silhouette aligned in time-series by using deep learning.

In extraction of a gait feature in each of the documents described above, it is assumed that a person walks for sufficient time in the same direction. However, such walking is not always captured in an actual video, and, when such walking is not captured, it is difficult to extract a gait feature from the video, and thus authentication based on the gait feature is difficult. In other words, there is a problem that, when a person in a video changes a walking direction by a right turn, a left turn, and a turn, and when walking time of a person in a video is short, it is difficult to extract a gait feature and perform authentication.

Further, there is a problem that a gait feature without time-series information, such as skeletal information such as a leg length and a height described in Patent Document 2, has a lower expression capacity than that of another gait feature having time-series information. Thus, there is a problem that recognition accuracy decreases when the number of registered people increases and the like.

BRIEF SUMMARY

The disclosure has been made in view of the problems described above, and one of objects of the disclosure is to provide a technique for improving accuracy of verification of a person using a video.

A person authentication apparatus according to the disclosure includes 1) a generation unit that generates one or more second image sequences by applying a predetermined time-series operation to a first image sequence, 2) an extraction unit that extracts, from each of two or more image sequences among the first image sequence and the second image sequence, a gait feature of a person included in the image sequence, and 3) a verification unit that performs authentication of a person by comparing the plurality of extracted gait features with a verification feature being a gait feature stored in a storage unit.

A control method according to the disclosure is executed by a computer. The control method includes 1) a generation step of generating one or more second image sequences by applying a predetermined time-series operation to a first image sequence, 2) an extraction step of extracting, from each of two or more image sequences among the first image sequence and the second image sequence, a gait feature of a person included in the image sequence, and 3) a verification step of performing authentication of a person by comparing the plurality of extracted gait features with a verification feature being a gait feature stored in a storage unit.

A program according to the disclosure causes a computer to execute each step included in the control method according to the disclosure.

A technique for improving accuracy of verification of a person using a video is therefore provided.

DESCRIPTION OF EMBODIMENTS

Hereinafter, an example embodiment according to the disclosure will be described with reference to the drawings. Note that, in all of the drawings, a similar component has a similar reference sign, and description thereof will not be repeated. Further, in each block diagram, each block represents a configuration of a functional unit instead of a configuration of a hardware unit unless otherwise described.

Figure 1:
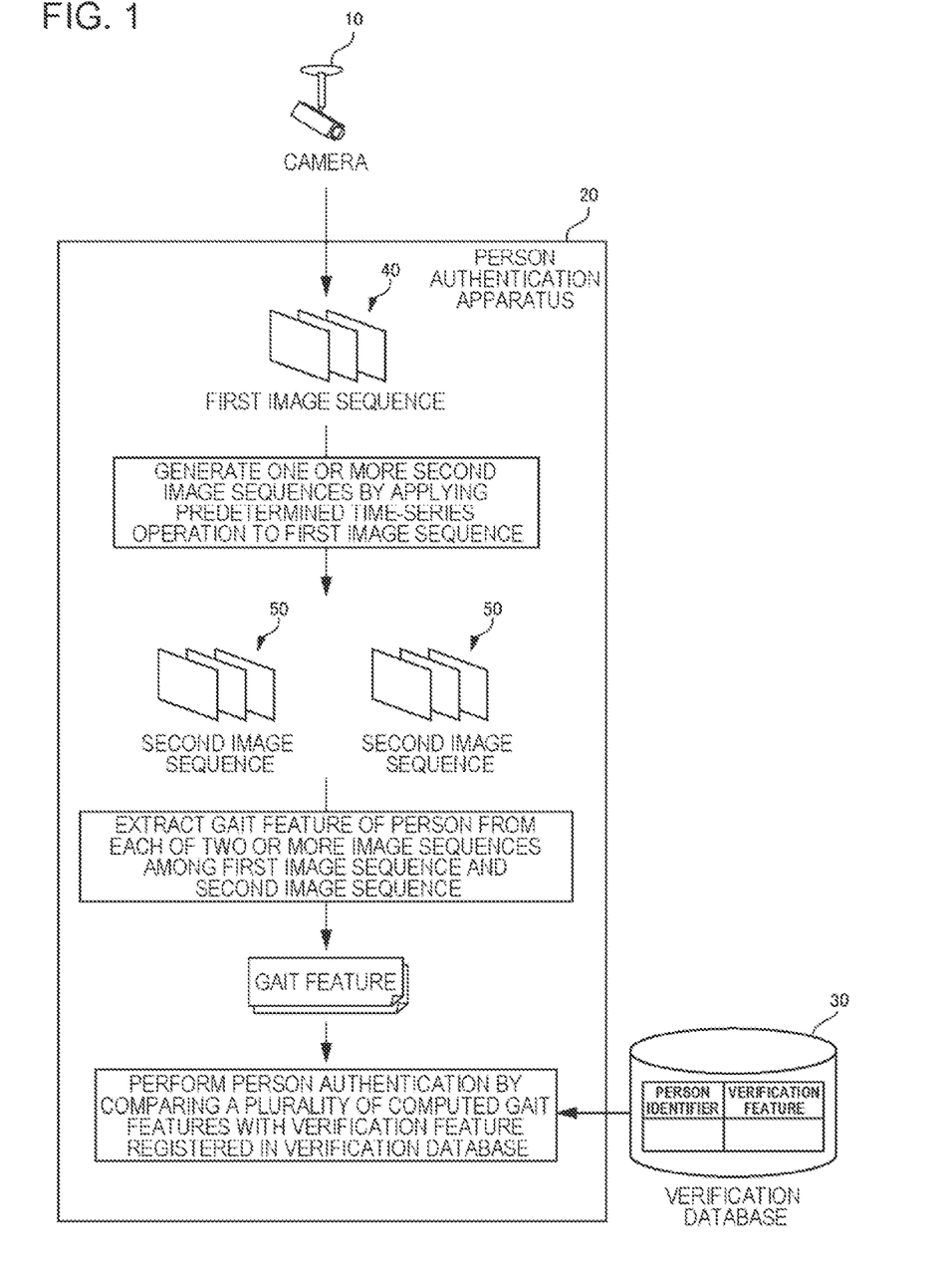
FIG. 1 is exemplification for facilitating understanding of a person authentication apparatus, and does not limit a content of the person authentication apparatus.

Example Embodiment 1 is first described. FIG. 1 is a diagram illustrating an outline of a person authentication apparatus 20 according to an example embodiment. FIG. 1 is exemplification for facilitating understanding of the person authentication apparatus 20, and does not limit a content of the person authentication apparatus 20.

A camera 10 generates a first image sequence 40 by performing capturing. The first image sequence 40 is time-series data of a captured image (hereinafter, an image 42) generated by the camera 10. For example, the first image sequence 40 is time-series data of a video frame, i.e., video data. The first image sequence 40 includes a person.

The person authentication apparatus 20 performs authentication of a person by analyzing an image sequence. To do so, first, the person authentication apparatus 20 generates one or more second image sequences 50 from the first image sequence 40. The second image sequence 50 is generated by applying a predetermined time-series operation to the first image sequence 40. For example, the second image sequence 50 is generated by sorting a plurality of images 42 constituting the first image sequence 40 in inverse order in time-series.

The person authentication apparatus 20 extracts a gait feature of a person from each of two or more image sequences among the first image sequence 40 and the second image sequence 50. The person authentication apparatus 20 performs person authentication by verifying a plurality of extracted gait features with a gait feature stored in a verification database 30 described later. The person authentication herein is, for example, processing of "determining whether a person included in the first image sequence 40 is registered in the verification database 30", processing of "determining a person (an identifier of a person) included in the first image sequence 40 by using the verification database 30", and the like.

The verification database 30 is any storage apparatus that stores a gait feature of a person. Herein, a gait feature stored in the verification database 30 is also referred to as a verification feature. For example, the verification database 30 stores one or more gait features of a person in association with an identifier of the person. Note that, the verification database may store a gait feature registered in advance, and may store a gait feature transmitted from a different person authentication system that operates at the same time.

An advantageous effect is as follows. In the example embodiment, one or more second image sequences 50 are generated from the first image sequence 40 by a predetermined time-series operation, and a gait feature of a person is extracted from each of two or more image sequences. Then, authentication of the person is performed by comparing the plurality of extracted gait features with a verification feature stored in the verification database 30. In this way, in the person authentication apparatus 20, a plurality of image sequences are acquired based on one image sequence, and person authentication is performed by using a gait feature of a person acquired from each of the image sequences, and thus accuracy of person authentication can be increased as compared to a case where person authentication is performed by using only an image sequence acquired from the camera 10.

Figure 2:
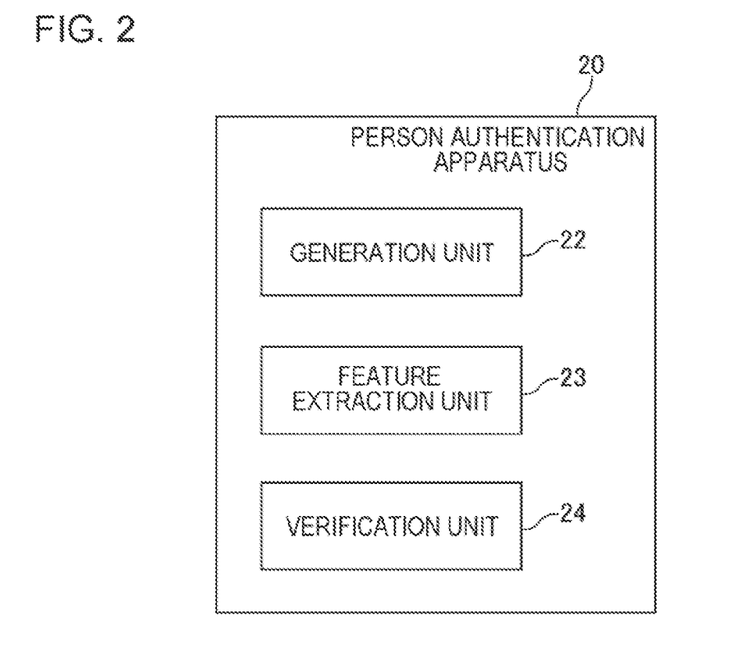
FIG. 2 is a block diagram illustrating a configuration of the person authentication apparatus.

An example of a functional configuration is described next. FIG. 2 is a block diagram illustrating a functional configuration of the person authentication apparatus 20. The person authentication apparatus 20 includes a generation unit 22, a feature extraction unit 23, and a verification unit 24. The generation unit 22 generates one or more second image sequences 50 by applying a predetermined time-series operation to the first image sequence 40. The feature extraction unit 23 extracts, from each of two or more image sequences among the first image sequence 40 and the second image sequence 50, a gait feature of a person included in the image sequence. The verification unit 24 performs person authentication by comparing the plurality of extracted gait features with a verification feature stored in the verification database 30.

Figure 3:
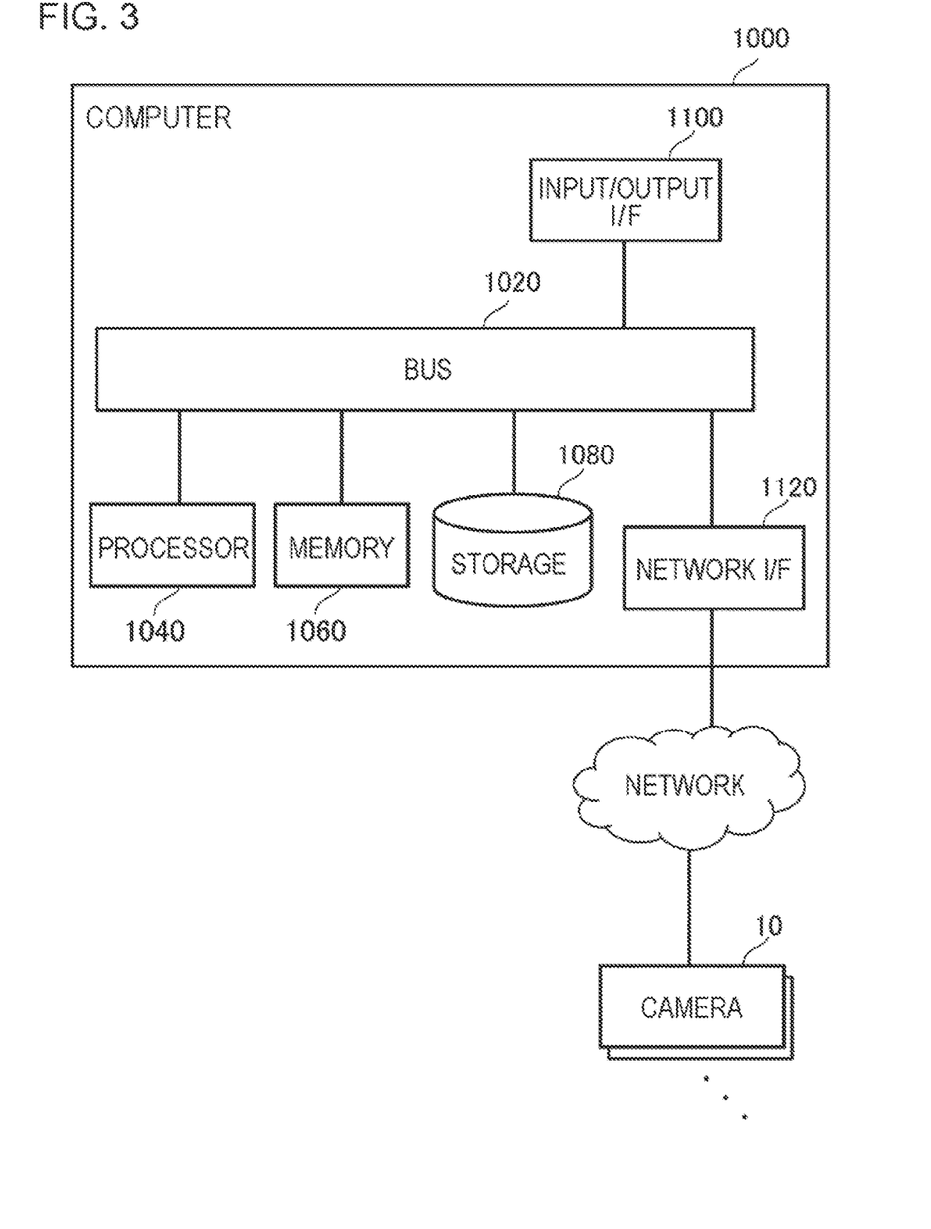
FIG. 3 is a diagram illustrating a computer for achieving the person authentication apparatus.

An example of a Hardware Configuration of Person Authentication Apparatus 20 is now described. FIG. 3 is a diagram illustrating a computer 1000 for achieving the person authentication apparatus 20. The computer 1000 is any computer. For example, the computer 1000 is a stationary computer such as a personal computer (PC) and a server machine. In addition, for example, the computer 1000 is a portable computer such as a smartphone and a tablet terminal. Note that, the computer 1000 may be a dedicated computer designed for achieving the person authentication apparatus 20, and may be a general-purpose computer.

The computer 1000 includes a bus 1020, a processor 1040, a memory 1060, a storage device 1080, an input/output interface 1100, and a network interface 1120. The bus 1020 is a data transmission path for allowing the processor 1040, the memory 1060, the storage device 1080, the input/output interface 1100, and the network interface 1120 to transmit and receive data with one another. However, a method of connecting the processor 1040 and the like to each other is not limited to bus connection.

The processor 1040 is various types of processors such as a central processing unit (CPU), a graphics processing unit (GPU), and a field-programmable gate array (FPGA). The memory 1060 is a main storage apparatus achieved by using a random access memory (RAM) and the like. The storage device 1080 is an auxiliary storage apparatus achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard and an output apparatus such as a display apparatus are connected to the input/output interface 1100.

The network interface 1120 is an interface for connecting the computer 1000 to a communication network. The communication network is, for example, a local area network (LAN) and a wide area network (WAN). A method of connection to the communication network by the network interface 1120 may be wireless connection or wired connection.

The storage device 1080 stores a program module that achieves each functional component unit of the person authentication apparatus 20. The processor 1040 achieves a function associated with each program module by reading each of the program modules to the memory 1060 and executing the program module.

The camera 10 is any camera that generates the first image sequence 40 by generating the time-series image 42 by repeatedly performing capturing. For example, the camera 10 is a surveillance camera provided for monitoring a specific facility, a specific road, and the like. An installation place of the camera 10 may be indoor and outdoor.

The camera 10 may be a camera (hereinafter, a fixed camera) whose position does not move, and may be a camera (hereinafter, a mobile camera) whose position moves. For example, a fixed camera is a camera fixed and installed on various places such as a wall, a pillar, or a ceiling. A wall and the like on which a fixed camera is installed may be fixed in a position for a certain degree of period of time, and is not limited to a place whose position does not change at all. For example, a wall and the like on which a fixed camera is installed may be a partition, a pillar, and the like temporarily installed at an event site and the like.

For example, a mobile camera may be a camera attached to a person whose position moves or a mobile object. A mobile camera worn by a person is, for example, a camera (a video camera and a camera of a portable terminal such as a smartphone) held by a hand, a camera (such as a wearable camera) fixed on a head, a chest, and the like, or the like. For example, a mobile object is a car, a motorcycle, a robot, a flying object (such as a drone and an airship), or the like. A camera attached to a mobile object may be a camera attached for being used as a so-called drive recorder, and may be a camera attached separately for monitor capturing. Note that, a fixed camera may be achieved by stopping a position of a mobile camera.

Herein, the computer 1000 that achieves the person authentication apparatus 20 may be the camera 10. In this case, the camera 10 generates the second image sequence 50 from the first image sequence 40 generated by the camera 10 itself, and performs person authentication utilizing the second image sequence 50. As the camera 10 having such a function, a camera referred to as an intelligent camera, a network camera, an Internet protocol (IP) camera, or the like, for example, can be used. Note that, all functions of the person authentication apparatus may not be achieved by the camera 10, and only a part of a function of the person authentication apparatus 20 may be achieved by the camera 10.

Figure 4:
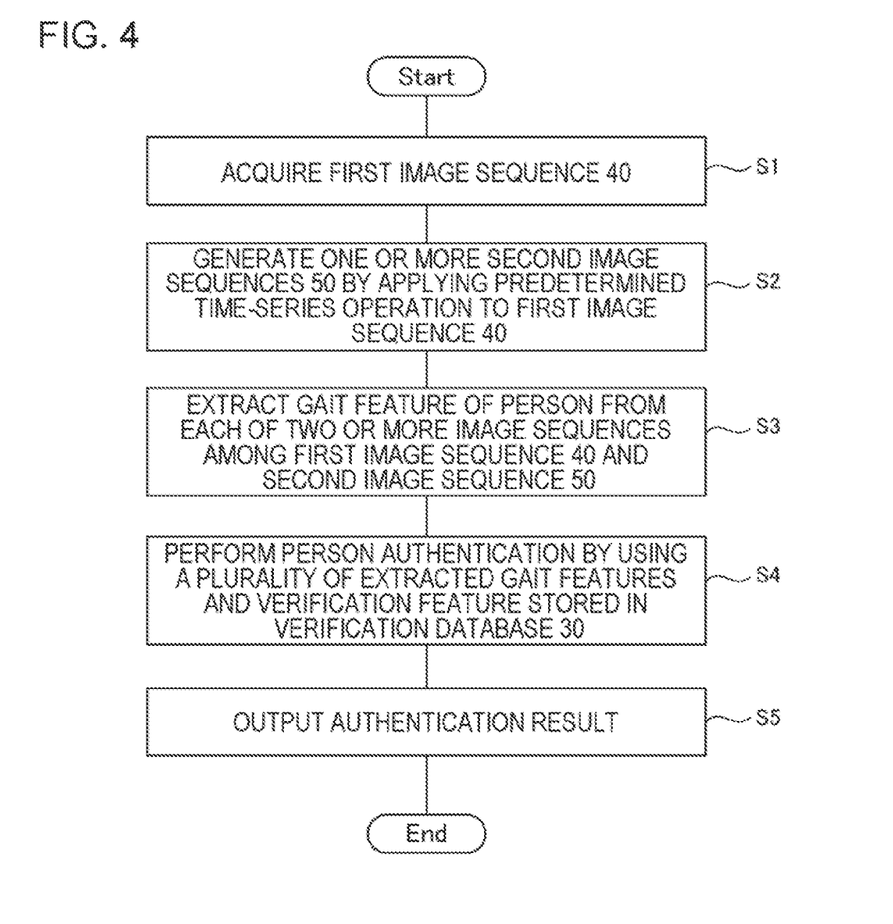
FIG. 4 is a flowchart illustrating a flow of processing performed by the person authentication apparatus.

FIG. 4 is a flowchart illustrating a flow of processing performed by the person authentication apparatus 20. The generation unit 22 acquires the first image sequence 40 generated by the camera 10 (S1). The generation unit 22 generates the second image sequence 50 by performing a predetermined time-series operation on the first image sequence 40 (S2). The feature extraction unit 23 extracts a gait feature from each of a plurality of image sequences (two or more image sequences among the first image sequence 40 and the second image sequence 50) (S3). The verification unit 24 performs person authentication by using the plurality of extracted gait features and a verification feature stored in the verification database 30 (S4). The person authentication apparatus 20 outputs an authentication result (S5).

The generation unit 22 acquires the first image sequence 40 (S1). Herein, various methods can be utilized as a method of acquiring the first image sequence 40. For example, the generation unit 22 acquires the first image sequence 40 by receiving the first image sequence 40 transmitted from the camera 10. In addition, for example, the generation unit 22 acquires the first image sequence 40 by reading, from a storage apparatus, the first image sequence 40 stored in the storage apparatus by the camera 10.

The generation unit 22 generates one or more second image sequences 50 by applying a predetermined time-series operation to the first image sequence 40 (S2). Hereinafter, a specific example of the predetermined time-series operation will be described.

Figure 5:
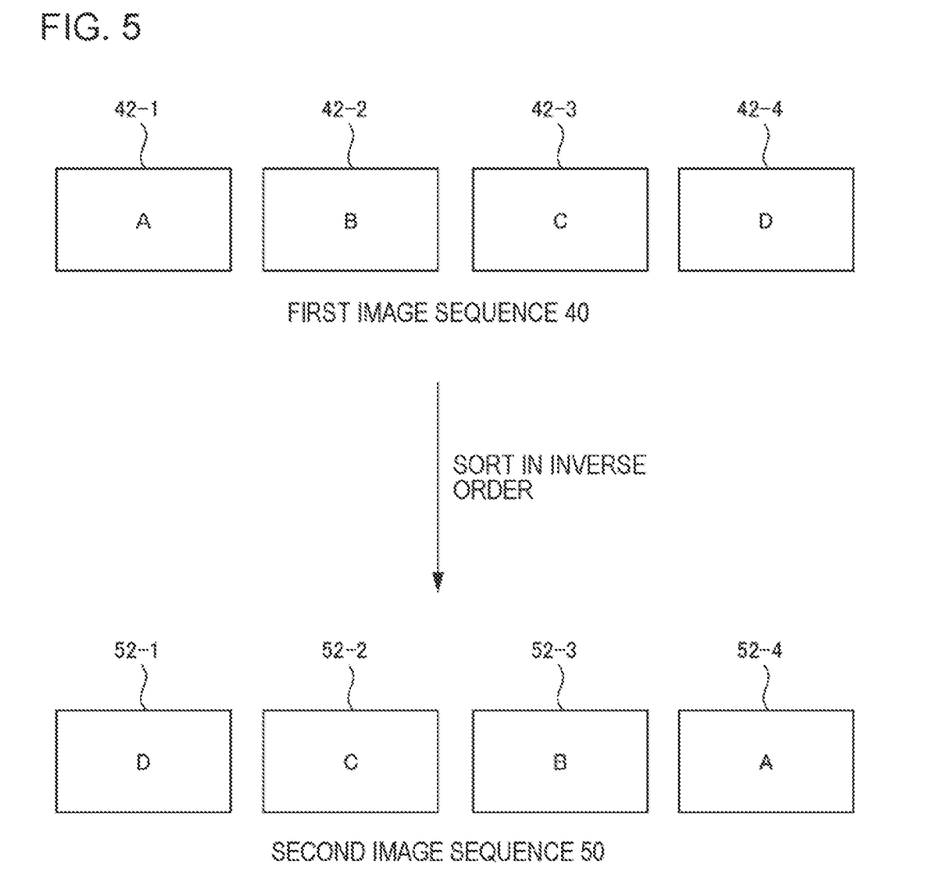
FIG. 5 is a diagram illustrating a first example of a time-series operation.

FIG. 5 is a diagram illustrating a first example of the time-series operation. In FIG. 5, the generation unit 22 generates the second image sequence 50 by sorting a captured images (hereinafter, the images 42) constituting the first image sequence 40 in inverse order. For example, the first image sequence 40 in FIG. 5 includes an image 42-1, an image 42-2, an image 42-3, and an image 42-4 arranged in this order. Then, the second image sequence 50 is constituted by arranging the images in inverse order of the image 42-4, the image 42-3, the image 42-2, and the image 42-1. In other words, an image 52-1, an image 52-2, an image 52-3, and an image 52-4 are equivalent to the image 42-4, the image 42-3, the image 42-2, and the image 42-1, respectively.

By generating the second image sequence 50 by sorting the first image sequence 40 in inverse order in such a manner, and utilizing the second image sequence 50 for verification, even when a length of the first image sequence 40 is short (the number of the images 42 is small), verification can be performed by using a gait feature extracted from an image sequence having a similar walking state. Thus, an influence of a length of an image sequence acquired from the camera 10 on accuracy of person authentication can be reduced, and authentication having high accuracy can be achieved even when a length of an image sequence acquired from the camera 10 is short.

Figure 6:
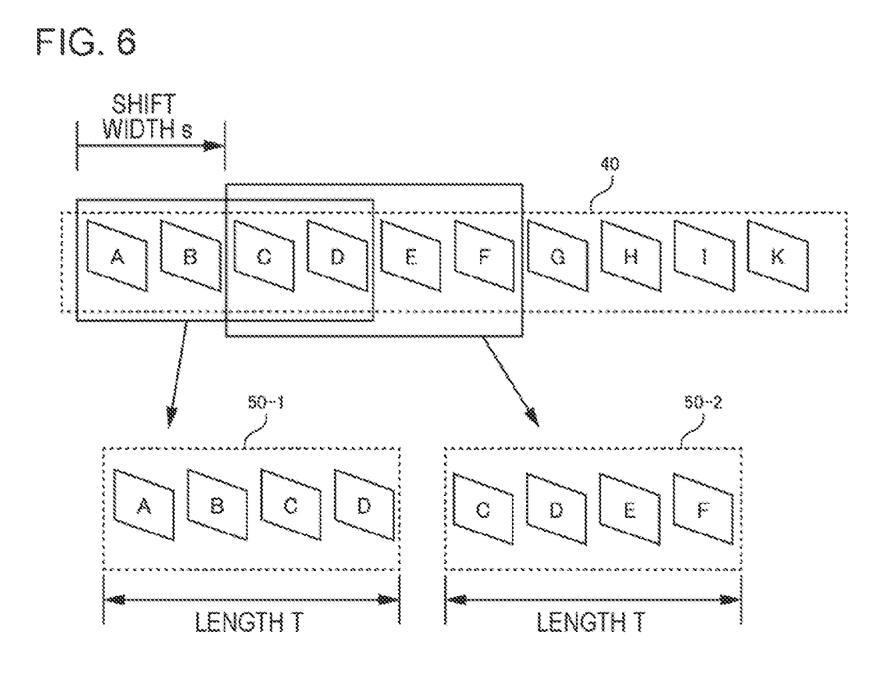
FIG. 6 is a diagram illustrating a second example of the time-series operation.

FIG. 6 is a diagram illustrating a second example of the time-series operation. In FIG. 6, the generation unit 22 generates the second image sequence 50 by extracting an image sequence in a part of a period from the first image sequence 40. For example, in the example in FIG. 6, the generation unit 22 extracts continuous T of images 42 from the first image sequence 40, and sets, as the second image sequence 50, an image sequence constituted by the extracted images 42.

Herein, it is suitable that the generation unit 22 extracts an image sequence in a plurality of periods different from each other from the first image sequence 40. For example, in FIG. 6, a second image sequence 50-1 and a second image sequence 50-2 are extracted. Herein, the second image sequence 50-1 is constituted by the T of images 42 starting from a beginning of the first image sequence 40. On the other hand, the second image sequence 50-2 is constituted by the T of images 42 starting from a position shifted rearward by s with respect to a beginning of the second image sequence 50-1.

Herein, the length T and the shift width s of the second image sequence 50 can have any size. For example, a length of the second image sequence 50 is determined as 0.3 second in terms of time. In this case, when the camera 10 generates 25 images for one second, the number of images constituting the second image sequence 50 is eight. It is suitable that a slide width is smaller than a length of the second image sequence 50. For example, it is assumed that a shift width is one or two when the number of images constituting the second image sequence 50 is eight. In this way, the second image sequences 50 partially overlap each other.

By generating one or more second image sequences 50 by cutting out a part of the first image sequence 40 in such a manner, even when a person changes a traveling direction in the first image sequence 40, and the like, verification can be performed by using a gait feature extracted from a portion of a traveling direction being easy to verify. Thus, an influence of a change in traveling direction of a person in the middle of the first image sequence 40 on accuracy of authentication can be reduced, and authentication having high accuracy can be achieved even when a person changes a traveling direction in the middle of the first image sequence 40.

The predetermined time-series operation may be an operation acquired by combining the two examples described above. For example, the predetermined time-series operation is an operation of "extracting a part of the images 42 from the first image sequence 40 arranged in inverse order in time-series". Further, the predetermined time-series operation may be a time-series operation other than the two examples described above.

In the example mentioned above, the image 42 constituting the first image sequence 40 is used as it is as an image 52 constituting the second image sequence 50. However, the generation unit 22 may apply predetermined processing (image processing) to the image 42, and generate the second image sequence 50 by using the processed image 42.

Figure 7:
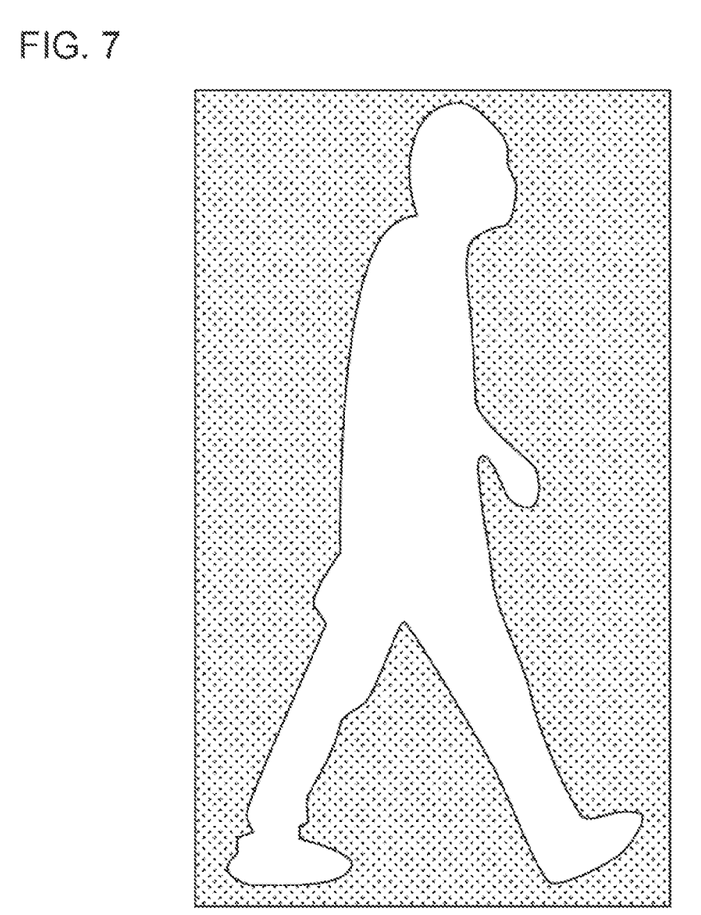
FIG. 7 is a diagram illustrating one example of a silhouette image generated by a generation unit.

Any image processing can be used as image processing applied to the image 42 by the generation unit 22. For example, the generation unit 22 applies image processing of reducing noise to the image 42. In addition, for example, the generation unit 22 performs image processing of converting the image 42 into a silhouette image of a person included in the image 42. The silhouette image is a binarized image in which an image region representing a person and the other image region have pixel values different from each other. FIG. 7 is a diagram illustrating one example of a silhouette image generated by the generation unit 22. Note that, black color is represented by a dot pattern in FIG. 7 for the sake of illustration.

In order to generate a silhouette image, first, the generation unit 22 detects a person (detects an image region representing a person) from the image 42. Herein, an existing technique can be utilized as a technique for detecting an image region representing a person from an image. For example, a technique using a convolutional neural network, a technique using histogram of oriented gradients (HOG), and the like can be utilized.

Furthermore, the generation unit 22 converts the image 42 into a silhouette image of a detected person. An existing technique can be utilized for generation of a silhouette image. For example, a silhouette image of a person is generated simultaneously with detection of a person by a technique using a convolutional neural network. In addition, for example, a silhouette generated in advance by a technique using a background difference and the like may be integrated with a detection result of a person.

The first image sequence 40 is converted into an image sequence of a silhouette image by converting each image 42 constituting the first image sequence 40 into a silhouette image. The generation unit 22 generates the second image sequence 50 by applying a predetermined time-series operation to the image sequence of the silhouette image. In this way, the second image sequence 50 also becomes an image sequence of a silhouette image.

The feature extraction unit 23 extracts a gait feature from each of a plurality of image sequences (S3). The feature extraction unit 23 extracts a gait feature at least from the second image sequence 50 generated by the generation unit 22. On the other hand, a gait feature may be or may not be extracted from the first image sequence 40.

An existing technique for extracting a space-time image feature from an image sequence can be utilized as a technique for extracting a gait feature of a person from an image sequence. Herein, the space-time image feature is a feature that simultaneously expresses an image feature of each image and time-series information about the image feature. For example, a gait feature can be extracted by a technique using a convolutional neural network and a technique using dense trajectories (DT). For example, when a convolutional neural network is used, the feature extraction unit 23 inputs an image sequence to the convolutional neural network, and extracts an output of a middle layer (hidden layer) as a gait feature. Note that, when a middle layer is formed of a plurality of layers, an output of any layer among the plurality of layers can be utilized for a gait feature.

The verification unit 24 performs person authentication by comparing (verifying) a gait feature extracted by the feature extraction unit 23 with a verification feature stored in the verification database 30 (S4). For example, the verification unit 24 computes a verification score between each gait feature extracted by the feature extraction unit 23 and each verification feature stored in the verification database 30. For example, when m of verification features are stored in the verification database 30, m of verification scores are computed for a gait feature extracted from each image sequence. The verification score is an index value representing a level of a degree of similarity between a gait feature and a verification feature.

Various index values representing a degree of similarity between features can be utilized as a verification score. For example, a distance (such as an Euclidean distance) between a gait feature and a verification feature, and a degree of similarity (angle) such as a cosine similarity degree can be used as a verification score. Note that, for an index value having a smaller value with a higher degree of similarity between features, such as a distance between features, it is suitable to set a higher value with a higher degree of similarity between features by using an inverse of the index value, multiplying the index value by a negative number, and the like. Further, for a verification score, any one of the plurality of types of index values described above may be used, or the plurality of types of index values may be computed and a statistic (such as a maximum value, a minimum value, an average value, or a weighted average value) of the index values may be used as a verification score.

Furthermore, the verification unit 24 computes, for each verification feature, a statistic (hereinafter, a statistic score) of verification scores for each image sequence acquired by comparison with the verification feature. In other words, one statistic score is acquired for each verification feature. The verification unit 24 performs person authentication by using a statistic score.

For example, it is assumed that the processing of "determining whether a person included in the first image sequence 40 is registered in the verification database 30" is performed as person authentication. In this case, for example, the verification unit 24 determines whether a statistic score is equal to or greater than a predetermined threshold value. When there is a statistic score equal to or greater than the predetermined threshold value (when a maximum value of the statistic score is equal to or greater than the threshold value), the verification unit 24 determines that the person included in the first image sequence 40 is registered in the verification database 30. On the other hand, when there is no statistic score equal to or greater than the predetermined threshold value (when a maximum value of the statistic score is less than the threshold value), the verification unit 24 determines that the person included in the first image sequence 40 is not registered in the verification database 30.

In addition, for example, it is assumed that the processing of "determining a person included in the first image sequence 40 by using the verification database 30" is performed as person authentication. For example, in this case, the verification unit 24 determines a statistic score that is equal to or greater than the predetermined threshold value described above and is maximum from among statistic scores. Then, the verification unit 24 determines a person having a verification feature associated with the determined statistic score (a person having a person identifier associated with the verification feature) as a person included in the first image sequence 40. For example, when a statistic score computed between a verification feature of a person A registered in the verification database 30 and a gait feature computed by the feature extraction unit 23 is a maximum statistic score and is equal to or greater than a predetermined threshold value, a person included in the first image sequence 40 is determined as the person A. Note that, when the maximum statistic score is less than the predetermined threshold value, the verification unit 24 determines that the person included in the first image sequence 40 is not registered in the verification database 30.

The person authentication apparatus 20 outputs an authentication result (S5). There are various methods of outputting an authentication result. For example, it is assumed that the processing of "determining whether a person included in the first image sequence 40 is registered in the verification database 30" is performed as person authentication. In this case, for example, the person authentication apparatus 20 performs an output representing whether a person included in the first image sequence 40 is registered in the verification database 30. For example, the output is a text message or a voice message representing that the "person included in the first image sequence 40 is a person registered in the verification database 30" or the "person included in the first image sequence 40 is not a person registered in the verification database 30". In addition, for example, an output using a lamp that outputs a color in response to a determination result and the like may be performed.

In addition, for example, it is assumed that the processing of "determining a person included in the first image sequence 40 by using the verification database 30" is performed as person authentication. In this case, for example, the person authentication apparatus 20 performs an output of an identifier of the determined person or an output representing that the "person included in the first image sequence 40 is not a person registered in the verification database 30". For example, the output is a text message or a voice message.

Herein, each output apparatus (a display apparatus and the like that displays a text message, a speaker and the like that outputs a voice message, or a lamp and the like) may be provided in the person authentication apparatus 20 and may be provided outside the person authentication apparatus 20. In a latter case, for example, the person authentication apparatus 20 transmits, to another apparatus, information representing an output.

The example embodiment according to the disclosure is described above in detail, but the disclosure is not limited to the example embodiment described above, and the example embodiment described above to which modification and correction are added without departing from the gist of the disclosure is also included in the disclosure.

A part or the whole of the above-described example embodiments may also be described as in supplementary notes below, which is not limited thereto.

Supplementary note 1. A person authentication apparatus, including:
- a generation unit that generates one or more second image sequences by applying a predetermined time-series operation to a first image sequence;
- an extraction unit that extracts, from each of two or more image sequences among the first image sequence and the second image sequence, a gait feature of a person included in the image sequence; and
- a verification unit that performs authentication of a person by comparing the plurality of extracted gait features with a verification feature being a gait feature stored in a storage unit.

Supplementary note 2. The person authentication apparatus according to supplementary note 1, wherein
the generation unit generates the second image sequence by sorting images included in the first image sequence in inverse order in time-series.

Supplementary note 3. The person authentication apparatus according to supplementary note 1, wherein
the generation unit extracts a plurality of images from a part of a period of the first image sequence, and generates the second image sequence constituted by the plurality of extracted images.

Supplementary note 4. The person authentication apparatus according to supplementary note 3, wherein
the generation unit generates a first of the second image sequence from a first period included in the first image sequence, and generates a second of the second image sequence from a second period included in the first image sequence, and
the first period and the second period partially overlap each other.

Supplementary note 5. The person authentication apparatus according to any one of supplementary notes 1 to 4, wherein
the generation unit detects a person from each image constituting the first image sequence, generates a silhouette image of the detected person, and generates the second image sequence by using the generated silhouette image.

Supplementary note 6. The person authentication apparatus according to any one of supplementary notes 1 to 5, wherein
the extraction unit extracts, as the gait feature extracted from an image sequence, a space-time image feature of a person detected from the image sequence.

Supplementary note 7. The person authentication apparatus according to any one of supplementary notes 1 to 5, wherein
the extraction unit extracts the gait feature by inputting an image sequence to a convolutional neural network.

Supplementary note 8. The person authentication apparatus according to supplementary note 7, wherein
the convolutional neural network includes an input layer, a middle layer, and an output layer, and
the extraction unit extracts, as the gait feature, an output from any layer constituting the middle layer.

Supplementary note 9. The person authentication apparatus according to any one of supplementary notes 1 to 8, wherein
the verification unit
computes, for each of a plurality of verification features stored in the storage unit, a verification score representing a degree of similarity to the gait feature extracted from each image sequence,
computes, for each of the verification features, a statistic score being a statistic of the plurality of computed verification scores, and
performs authentication of a person included in the first image sequence by using the statistic score for each of the verification features.

Supplementary note 10. The person authentication apparatus according to supplementary note 9, wherein
the verification unit determines that the first image sequence is a person already registered when any of the statistic score is equal to or greater than a predetermined threshold value.

Supplementary note 11. The person authentication apparatus according to supplementary note 9, wherein
the storage unit stores an identifier of a person and a verification feature of the person in association with each other, and
the verification unit
determines a verification feature having the statistic score that is maximum and is equal to or greater than a predetermined threshold value from among the plurality of verification features, and
determines, as a person included in the first image sequence, a person having an identifier associated with the determined verification feature in the storage unit.

Supplementary note 12. A control method performed by a computer, including:

a generation step of generating one or more second image sequences by applying a predetermined time-series operation to a first image sequence;

an extraction step of extracting, from each of two or more image sequences among the first image sequence and the second image sequence, a gait feature of a person included in the image sequence; and a verification step of performing authentication of a person by comparing the plurality of extracted gait features with a verification feature being a gait feature stored in a storage unit.

Supplementary note 13. The control method according to supplementary note 12, further including, in the generation step, generating the second image sequence by sorting images included in the first image sequence in inverse order in time-series.

Supplementary note 14. The control method according to supplementary note 12, further including, in the generation step, extracting a plurality of images from a part of a period of the first image sequence, and generating the second image sequence constituted by the plurality of extracted images.

Supplementary note 15. The control method according to supplementary note 14, further including, in the generation step, generating a first of the second image sequence from a first period included in the first image sequence, and generating a second of the second image sequence from a second period included in the first image sequence, wherein the first period and the second period partially overlap each other.

Supplementary note 16. The control method according to any one of supplementary notes 12 to 15, further including, in the generation step, detecting a person from each image constituting the first image sequence, generating a silhouette image of the detected person, and generating the second image sequence by using the generated silhouette image.

Supplementary note 17. The control method according to any one of supplementary notes 12 to 16, further including, in the extraction step, extracting, as the gait feature extracted from an image sequence, a space-time image feature of a person detected from the image sequence.

Supplementary note 18. The control method according to any one of supplementary notes 12 to 16, further including, in the extraction step, extracting the gait feature by inputting an image sequence to a convolutional neural network.

Supplementary note 19. The control method according to supplementary note 18, wherein the convolutional neural network including an input layer, a middle layer, and an output layer; and, the control method further comprising, in the extraction step, extracting, as the gait feature, an output from any layer constituting the middle layer.

Supplementary note 20. The control method according to any one of supplementary notes 12 to 19, further including:

in the verification step, computing, for each of a plurality of verification features stored in the storage unit, a verification score representing a degree of similarity to the gait feature extracted from each image sequence;

computing, for each of the verification features, a statistic score being a statistic of the plurality of computed verification scores; and performing authentication of a person included in the first image sequence by using the statistic score for each of the verification features.

Supplementary note 21. The control method according to supplementary note 20, further including, in the verification step, determining that the first image sequence is a person already registered when any of the statistic score is equal to or greater than a predetermined threshold value.

Supplementary note 22. The control method according to supplementary note 20, wherein the storage unit storing an identifier of a person and a verification feature of the person in association with each other, the control method further comprising, in the verification step, determining a verification feature having the statistic score that is maximum and is equal to or greater than a predetermined threshold value from among the plurality of verification features; and determining, as a person included in the first image sequence, a person having an identifier associated with the determined verification feature in the storage unit.

Supplementary note 23. A program causing a computer to execute each step of the control method according to any one of supplementary notes 12 to 22.

This application is based upon and claims the benefit of priority from Japanese patent application No. 2018-248213, filed on Dec. 28, 2018, the disclosure of which is incorporated herein in its entirety by reference.

REFERENCE SIGNS LIST

10 Camera
20 Person authentication apparatus
22 Generation unit
23 Feature extraction unit
24 Verification unit
30 Verification database
40 First image sequence
42 Image
50 Second image sequence
52 Image
1000 Computer
1020 Bus
1040 Processor
1060 Memory
1080 Storage device
1100 Input/output interface
1120 Network interface

What is claimed is:

1. A person authentication apparatus comprising:

at least one memory storing instructions; and at least one processor configured to execute the instructions to:

generate one or more second image sequences by applying a predetermined time-series operation to a first image sequence, and by sorting images included in the first image sequence in inverse order in time-series;

extract, from each of two or more image sequences among the first image sequence and the second image sequence, a gait feature of a person included in the image sequence; and perform authentication of a person by comparing the plurality of extracted gait features with a verification feature that is a gait feature stored in a storage device.

2. The person authentication apparatus according to claim 1, wherein the processor is configured to
extract a plurality of images from a part of a period of the first image sequence, and generate the second image sequence constituted by the plurality of extracted images.

3. The person authentication apparatus according to claim 2, wherein the processor is configured to
generate a first of the second image sequence from a first period included in the first image sequence, and generate a second of the second image sequence from a second period included in the first image sequence, and
the first period and the second period partially overlap each other.

4. The person authentication apparatus according to claim 1, wherein the processor is configured to
detect a person from each image constituting the first image sequence, generate a silhouette image of the detected person, and generate the second image sequence by using the generated silhouette image.

5. The person authentication apparatus according to claim 1, wherein the processor is configured to
extract, as the gait feature extracted from an image sequence, a space-time image feature of a person detected from the image sequence.

6. The person authentication apparatus according to claim 1, wherein the processor is configured to
extract the gait feature by inputting an image sequence to a convolutional neural network.

7. The person authentication apparatus according to claim 6, wherein
the convolutional neural network includes an input layer, a middle layer, and an output layer, and
the processor is configured to extract, as the gait feature, an output from any layer constituting the middle layer.

8. The person authentication apparatus according to claim 1, wherein the processor is configured to
compute, for each of a plurality of verification features stored in the storage device, a verification score representing a degree of similarity to the gait feature extracted from each image sequence,
compute, for each of the verification features, a statistic score being a statistic of the plurality of computed verification scores, and
perform authentication of a person included in the first image sequence by using the statistic score for each of the verification features.

9. The person authentication apparatus according to claim 8, wherein the processor is configured to
determine that a person in the first image sequence is a person already registered when any of the statistic score is equal to or greater than a predetermined threshold value.

10. The person authentication apparatus according to claim 8, wherein
the storage device stores an identifier of a person and a verification feature of the person in association with each other,
the processor is configured to
determine a verification feature having the statistic score that is maximum and is equal to or greater than a predetermined threshold value from among the plurality of verification features, and
determine, as a person included in the first image sequence, a person having an identifier associated with the determined verification feature in the storage device.

11. A control method performed by a computer and comprising:
generating one or more second image sequences by applying a predetermined time-series operation to a first image sequence, and by sorting images included in the first image sequence in inverse order in time-series;
extracting, from each of two or more image sequences among the first image sequence and the second image sequence, a gait feature of a person included in the image sequence; and
performing authentication of a person by comparing the plurality of extracted gait features with a verification feature that is a gait feature stored in a storage device.

12. A non-transitory storage medium storing a program causing a computer to execute a control method, the control method comprising:
generating one or more second image sequences by applying a predetermined time-series operation to a first image sequence, and by sorting images included in the first image sequence in inverse order in time-series;
extracting, from each of two or more image sequences among the first image sequence and the second image sequence, a gait feature of a person included in the image sequence; and
performing authentication of a person by comparing the plurality of extracted gait features with a verification feature that is a gait feature stored in a storage device.

* * * * *